Patented May 20, 1947

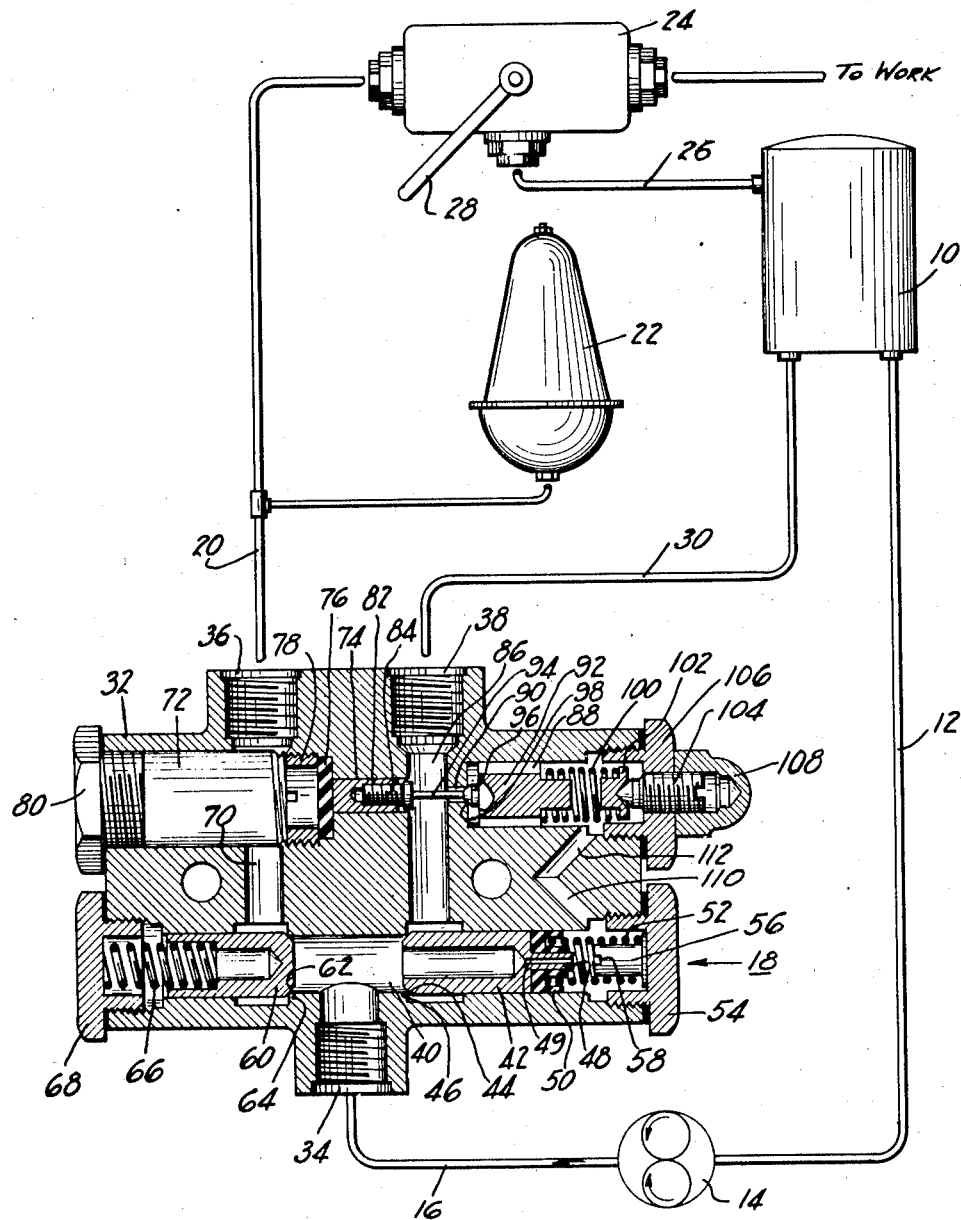

2,420,890

UNITED STATES PATENT OFFICE 2,420,890

FLUID PRESSURE CONTROL SYSTEM

Stanley I. MacDuff, South Bend, Ind., assignor to Bendix Aviation Corporation, South Bend, Ind., a corporation of Delaware Application July 20, 1942, Serial No. 451,593

6 Claims. (Cl. 137—153)

This invention relates generally to fluid pressure systems for operating various hydraulic mechanisms, and particularly to regulating or unloading valves for use in such systems. More particularly, this invention relates to fluid pressure systems used in aircraft, with particular regard to regulating or unloading valves for such aircraft fluid pressure systems.

Most fluid pressure systems for aircraft include a pump for supplying fluid under pressure to the hydraulic system, which pump is most conveniently driven directly by the aircraft motor, and therefore must operate continuously while the aircraft is in flight. The demand for hydraulic fluid under pressure fluctuates widely during this period and for long time intervals there may be no demand at all. It is essential, for efficient and satisfactory operation of the hydraulic devices, that fluid be instantly available at all times within close limits of the desired operating or peak pressure for which the system is designed. To this end an accumulator is installed consisting essentially of a compressed air chamber partially filled with fluid. At periods of low fluid demand, fluid is delivered to this chamber further compressing the air until the desired maximum pressure is attained, and thereafter the fluid delivered by the pump must be returned to the reservoir. A simple relief valve set to relieve at the desired high pressure would accomplish this at a cost, however, of much lost power and reduction in the useful life of the pump. At times of peak demand, fluid flows from the accumulator with a resulting expansion of the air therein and lowering of the air pressure. Thus the accumulator serves as an auxiliary to the pump to supply additional fluid when needed and also serves to balance out undesirable pressure variations.

To overcome the undesirable features of a relief valve, as stated above, unloading valves have been devised, which, when the pressure in the accumulator reaches the desired high limit, open or unload to deliver the fluid from the pump directly back to the reservoir at low pressure. A check valve is usually incorporated in the system to maintain the fluid under pressure in the accumulator. Such unloading valves are also intended to close or load when a certain amount of fluid has been withdrawn from the accumulator thereby lowering the pressure, so that the fluid from the pump is again delivered under high pressure to the accumulator or the various hydraulically operated devices. It is desirable that the pressure difference between loading and unloading operation of this valve be held at a minimum and that these operations occur consistently at the same pressures. It is also highly desirable for ease and economy in manufacture that the valve be easily adaptable or regulatable to operate between different pressure limits since no standards have been generally adopted in the aircraft industry, each aircraft manufacturer being inclined to adopt and use a different peak pressure for the hydraulic system.

Therefore, it is an object of this invention to provide a regulator or unloading valve for such a fluid pressure system which will be operable at the desired limits of pressure.

Another object is to provide a valve of the type mentioned which will close automatically at a predetermined low pressure in the system, and which will open automatically at a predetermined high pressure.

Still another object is to provide a valve of the type mentioned which is adjustable, so that it will open at any desired predetermined high pressure.

Yet another object is to provide a regulator or unloading valve which will have incorporated therein means for preventing flow of fluid in a reverse direction through the valve.

A still further object is to provide a novel valve construction for regulating the pressure in a fluid pressure system which will have a minimum of parts which are required to be held within close limits of dimension and concentricity.

Another object is to provide a novel valve construction which requires only a single casting to serve as a valve body.

Yet another object is to provide a valve of the type mentioned having a body which requires only very simple machining operations utilizing only the simplest jigs and fixtures.

A further object is to provide a simple control means for a regulator or unloading valve to initiate the regulating or unloading cycle of the valve, and which will not cause hammer, as has been present in some of the valves of the prior art.

A still further object is to provide a control means for a regulator valve which will be smooth in operation and which will initiate the regulating or unloading operation between very close desired limits of upper predetermined pressure.

Another object is to provide a regulator valve which opens slowly, thereby eliminating undesirable hydraulic hammer effects.

Other desirable advantages and functions of the regulator or unloading valve comprising a part of this invention will be apparent from a study of the specification and drawing following, in which the single figure shows a fluid pressure system having therein the valve according to the present invention, which is shown in longitudinal section.

The system shown in the single figure includes a reservoir 10 connected by a conduit 12 to a pump 14, which delivers fluid to the system shown through a conduit 16 and thence through the regulator valve 18. A conduit 20 connects the valve 18 to an accumulator 22 or to various hydraulically operated devices which are controlled by a valve 24. The valve 24 may be of any type previously known in the art and has within it a valve element which will permit fluid to pass from the line 20 to the work, or return fluid from the work to the reservoir 10 through a conduit 26. The operation of the valve is achieved by manipulating a handle 28 shown with the valve 24.

The fluid from the pump 14 will take a path through the valve 18 under certain conditions, so that fluid in the conduit 16 is by-passed through the valve 18 through a conduit 30 back to the reservoir 10.

The valve 18 comprises a body 32 having an entrance port 34, an outlet or working port 36 connected to the accumulator 22 and the control valve 24, and a second outlet or relief port 38 connected to the conduit 30 for returning fluid to the reservoir 10.

The entrance port 34 intersects a bore 40 which has therein a hollow plunger 42 having a tapered valve face 44 which is seated against a shoulder 46 in the bore 40. The hollow plunger 42 has an extension 48, which is drilled as at 49 to pass fluid through the hollow plunger 42, and which retains a cup-shaped packing member 50. The hollow plunger 42 and the packing member 50 are normally biased to the left by a spring 52 and a closure 54 threaded into the valve body 32, and having a pilot 56 for the spring 52. The left end of the plunger, that is, the valve face 44 may be considered to be divided into two annulated areas, one of which is subjected to the pressure at the inlet port, and the other of which is subjected to the pressure at the relief port. The effective area of the right end of plunger 42 on which pressure acts tending to move the plunger to the left is greater than the effective area of the left end of the plunger adjacent the inlet port on which the inlet pressure acts tending to move the plunger to the right. The pilot 56 has a slotted portion 58 for permitting fluid to pass at such times when the plunger 42 is biased to a position where the shank-like extension 48 is in contact with the pilot 56.

At the other end of bore 40 is a check valve 60 having a tapered face 62 which is seated against a shoulder 64 in the bore 40. The check valve 60 is normally urged to the right by a spring 66 retained in place by a hollow cap member 68, which is threaded into the valve body 32. The check valve 60 normally closes the communication of a bore 70 with the bore 40 to prevent the reverse flow of fluid from the accumulator 22 back to the pump 14.

A bore 72 intersects bore 70 and is co-axial with a bore 74. One end of bore 72 is closed by a resilient disc 76 which is held in place by a threaded and slotted element 78. The other end of the bore 72 is closed by a cap 80 threaded into the valve body 32. The resilient member 76 abuts a hollow piston 82 within the bore 74, into which is threaded an adjustable tappet 84. The bore 74 is then closed by the resilient member 76 at one end, and is open at the other end and intersects a bore 86 which is in alignment with the port 38 and which intersects the bore 40 adjacent the plunger 42.

Co-axial with bore 72 and bore 74 is a bore 88 having a constricted portion 90 which intersects bore 86. Within bore 88 is a fluted member 92 having an extension 94 which is enlarged adjacent the fluted member 92 to form a poppet valve 96 which is seated as at 98. The extension 94, the poppet 96, and the fluted member 92 are normally biased to the left by a spring 100, so that the extension 94 engages the tappet 84, and in such manner that the poppet 96 is closed on its seat at 98. The tappet 84 is provided for the purpose of adjusting the piston 82 so that its left hand end is in correct relation to the right hand surface of the resilient disc 76, when the tappet is in contact with extension 94 of fluted member 92. Spring 100 is restrained at its other end by a member 102, which in turn bears against a set screw 104 threaded within a cap member 106 secured to the body 32. The set screw 104 is enclosed by an acorn nut 108.

The chamber formed in the bore 40 between the packing member 50 and the closure 54 communicates with the bore 88 by means of a pair of intersecting passages 110 and 112. The area of passage 90 less the area of extension 94 is greater than the area of passage 49 through plunger 42.

The operation of the valve just described is as follows. Assuming that the system is at no residual pressure, for example having for some reason been vented to atmosphere, the first action taking place upon the operation of the pump 14 is the passing of fluid from the reservoir 10 through the conduit 12 to the valve 18 through conduit 16 at port 34. The initial movement of this fluid under pressure moves the plunger 42 from its seat to pass the fluid directly back to the reservoir 10 through bore 86, port 38 and conduit 30. The continued movement of fluid causes a portion of it to be by-passed through the hollow plunger 42 and through the drilled portion 49 of the extension 48 into the chamber formed between the hollow plunger 42 and the closure 54. The fluid continues to pass through the hollow plunger 42 until it fills the passages 110 and 112 and the chamber formed in the bore 88 between poppet 96 and the end closure of the bore 88 which consists of the cap member 106 and the set screw 104.

The pressure continues to build up behind the poppet 96 and the packing 50 until it is equal to the pressure at the port 34 supplied by the pump 14 and maintained by the force of the spring 52. At such time the plunger 42 will move against its seat 46, because of the load in spring 52, and because the force over the effective area of the packing 50 is greater than the force over the effective area on the seat 46 since the unit pressures on each area are equal. This movement of the hollow plunger 42, to close against the seat 46 takes place almost immediately after the pump 14 begins to operate.

At the same time the pressure at the port 34 and in the bore 40 is effective to move the check valve 60 from its seat to pass fluid under pressure from the conduit 16 through the port 34, the bore 40, the bore 70, and out the port 36 into the conduit 20 and thence to the accumulator 22, or through the control valve 42 to the various hydraulically operated devices.

At such time as the pressure in the accumulator reaches a desired predetermined upper limit (e. g. 1000 pounds per square inch) the valve 18 will operate to unload the fluid from the pump 14 directly back into the reservoir 10. The operation of the valve at this upper predetermined pressure limit is as follows.

The pressure from the accumulator 22 acts directly against the resilient disc 76 to urge the piston 74 and its tappet to the right to unseat the poppet 96 when the force on the piston equals the pumping pressure times the area of the poppet plus the force of the spring 100. The unseating of the poppet 96 dissipates the pressure behind it with the result that the force on the piston 74 will then only have to overcome that of spring 100 and will therefore compress that spring moving the poppet a substantial distance from its seat. Flow of fluid through passages 110—112 dissipates the pressure behind the hollow valve plunger 42 and when this pressure has diminished to the point where the load in spring 52 and the force on packing 50, which is the product of its effective area and the unit pressure behind the packing, is not equal to the force caused by the effective area on the seat 46, which is the product of unit pressure and the area of the seat at that point, the plunger 42 will move to the right, thereby by-passing fluid from the pump 14 directly back to the reservoir 10.

It will be understood that fluid will continue to flow through passage 49 into the space in back of plunger 42 but, because the area of constricted passage 90 is greater than that of passage 49, the fluid can escape more freely than it can enter, and consequently the pressure in this space will decrease permitting the valve to open as described above. By proper proportioning of the areas of these two passages, the opening of the valve may be made slow enough as to eliminate hydraulic hammer effects caused by the sudden rush of fluid under high pressure into a space containing fluid at low pressure.

With valve plunger 42 open it will be understood that check valve plunger 60 is closed trapping fluid at high pressure in passage 70 and the accumulator 22, and that the fluid delivered by the pump to passage 40 through port 34 is being maintained at a predetermined low pressure (e. g. 50 pounds per square inch) by the spring 52 urging the plunger 42 toward the left, and that beyond the valve plunger 42 in the passage 86 and conduit 30 the fluid is at atmospheric pressure or at least at a pressure only sufficient to overcome the fluid friction in these passages. Thus the pump is running freely and without substantial load whereby wear on its rubbing surfaces and bearings is materially reduced during any period when there is no demand for hydraulic fluid.

When the various hydraulically operated devices connected to the fluid pressure system are operated, the pressure will drop to some point below a desired predetermined low operating pressure. At such time the valve 18 will close, thereby closing the reservoir 10 to the fluid from the pump 14, and the check valve 60 will open to admit the fluid to accumulator 22. The operation of the valve at such time is as follows:

As the pressure acting on the resilient element decreases toward a low limit of working pressure the force upon the piston 74 and in turn against the poppet 96 will be less than the load on spring 100 permitting the spring to expand and move the poppet 96 towards its seat.

This movement will ultimately cause a restriction to the flow of fluid through passage 90 greater than the restriction of passage 49 and pressure will begin to build up in the spaces back of the poppet 96. This pressure acting on the area across seat 98 will supplement the force of spring 100 and will force the poppet quickly to its seat 98. At the same time the increase of pressure at the right of plunger 42 acting on the greater area of packing 50 will move the plunger 42 to the left against the pressure being exerted by the fluid on the lesser area of the seat 44 and the plunger 42 will therefore move against this seat preventing further flow to the reservoir 10 and forcing it through the check valve 60 to the accumulator 22.

The valve and the operation thereof have been described with reference to a particular set of operating conditions. It is possible in the construction shown to change the limits within which the valve is to operate. It is obvious that the load on spring 100 can be changed by rotating the set screw 104 in or out of the cap member 106. It is obvious also that the spring 100 can be selected to have any particular rate desired. The selection of the particular type of spring and the load thereon will determine the pressure at which the unloading operation will begin.

The pressure at which the accumulator will begin to load is a certain proportion of the unloading pressure as determined by the ratio of the areas of poppet seat 96 and piston 74. The selection of a greater or smaller diameter for the piston 74 and the bore 82 without correspondingly changing the seat of poppet 96 will vary the limits between which the valve 18 will load and unload. For example, the selection of a larger bore and piston will permit the pressure in bore 72 to act over a larger effective area. The load on spring 100 will have to be increased to balance the greater force on the piston 74 if the same unloading pressure is desired. After the piston 74 has moved to open the poppet 96, the force on the piston acting through the resilient disc 76 is opposed by load in spring 100 only. Since this force now acting on the piston through the resilient disc is greater than was the case with a smaller piston, it is obvious that the range between the upper pressure limit and the lower pressure limit will be decreased. Thus, by selecting a particular size piston to vary the range of pressures at which the valve 18 begins to load and then unloads, any desired range can be used, depending upon the demands of the hydraulically operated mechanisms.

It will be apparent also that the load and the rate of the spring 52 can be selected according to the particular back pressure desired when the valve is unloading from the pump 14 back to the reservoir 10.

From the foregoing description it will be apparent that there has been provided a valve which is simple and efficient in operation, which may be adjusted over various desired pressure ranges, which is simple to assemble and which is easy to manufacture, since packings and diaphragms serve to prevent leakage without the use of lapped fits between plungers and bores, and because the parts are few and of relatively simple form.

While this invention has been described with reference to a particular desirable embodiment thereof it is to be understood that the invention is not to be limited to the embodiment shown nor in any way other than by the terms of the claims appended.

I claim:

1. A regulator valve for a fluid pressure system comprising a body having inlet, working, and relief ports, a bore intersecting said inlet port, a pair of spaced bores in communication respectively with the working port and the relief port and intersecting the said first bore, a check valve in said body for preventing the passage of fluid from the working port to said inlet port and to permit passage of fluid from the inlet port to the working port, means at times preventing passage of fluid from the inlet port to the relief port, said means comprising a spring-biased plunger having a passage for fluid therethrough; a bore intersecting the spaced bores and parallel to the bore intersecting the inlet port, control means within said parallel bore for said first means comprising a resilient disk and an abutting piston and tappet movable in response to pressure at the working port, a spring-biased poppet movable with said disk and piston, the movement of said disk and tappet and spring-biased poppet creating a differential pressure across said first means to move said first means to a position whereby fluid is passed from the inlet port to the relief port.

2. A regulator valve for a fluid pressure system comprising a body having inlet, working, and relief ports, a bore intersecting said inlet port, a pair of spaced bores in communication respectively with the working port and the relief port and intersecting the said first bore, means at times preventing passage of fluid from the inlet port to the relief port, said means comprising a spring biased plunger having a passage for fluid therethrough; a bore intersecting the spaced bores and parallel to the bore intersecting the inlet port, control means within said parallel bore for said first means comprising a resilient disk and an abutting piston and tappet movable in response to pressure at the working port, a spring-biased poppet movable with said disk and piston, the movement of said disk and tappet and spring-biased poppet creating a differential pressure across said first means to move said first means to a position whereby fluid is passed from the inlet port to the relief port.

3. A regulator valve for a fluid pressure system comprising a body having inlet, working and relief ports, a bore intersecting said inlet port, a pair of spaced bores in communication respectively with the working port and the relief port and intersecting the said first bore, a check valve in said body for preventing the passage of fluid from said working port to said inlet port and to permit passage of fluid from the inlet port to the working port, means at times preventing passage of fluid from the inlet port to the relief port, said means comprising a spring-biased plunger having a passage for fluid therethrough, a passageway connecting the passage in the plunger to the relief port, control means for said first-named means comprising a piston-like member movable in response to pressure at the working port, a valve seat in the passageway, a spring biased poppet valve member normally seated on said seat and constructed and arranged to be unseated by the movement of said piston, said valve seat and piston having preselected effective areas so related one to the other so as to provide a predetermined pressure range for said regulator valve, the passage in the plunger having a smaller area than the effective flow area of said valve seat when the poppet member is unseated, the unseating of said poppet valve member causing a differential pressure to be created across said first-named means to move the same to pass fluid from the inlet port to the relief port.

4. A regulator valve for a fluid pressure system comprising a body having inlet, working and relief ports, a bore intersecting said inlet port, a pair of spaced bores in communication respectively with the working port and the relief port and intersecting the said first bore, a check valve in said body for preventing the passage of fluid from the working port to said inlet port and to permit passage of fluid from the inlet port to the working port, means comprising a spring-biased plunger normally positioned at the intersection of said first bore and one of said pair of bores and having one of its ends subjected to inlet pressure and arranged to prevent the passage of fluid from the inlet port to the relief port, a restricted passage connecting the inlet port to the other end of the plunger, a passageway connecting said other end of the plunger to the relief port, control means for said first-named means comprising a flexible diaphragm having one side subjected to working port pressure, a piston-like member abutting the other side of said diaphragm and movable in response to flexing of the diaphragm, a poppet valve normally spring seated in the passageway and constructed and arranged to be unseated in response to piston movement, the unseating of said poppet valve permits flow through said restricted passage from the inlet port to the relief port thereby reducing the pressure on said other end of the plunger to cause movement of the plunger to a position for passing fluid from the inlet to the relief port.

5. A regulator valve for a fluid pressure system comprising a body having inlet, working, and relief ports, a first bore intersecting the inlet port, a second bore spaced from said first bore, a pair of bores intersecting said first and second bores and communicating respectively with said working and relief ports, means for sealing the inlet port from the relief port comprising a member normally spring seated in one of said pair of bores adjacent said inlet and movable in response to a pressure differential across its end areas, a restricted passage connecting one end of said member to the other end thereof, a passageway connecting said other end of the member to the relief port, said member being constructed and arranged so that said one end thereof is adjacent the inlet port and when the member is in its normally seated position the said one end has an effective area smaller than the effective area of the said other end, and when said member is unseated the pressure drops across said one end between the inlet port and the relief port is substantially constant irrespective of variations in flow between said inlet and relief ports, and control means for said movable member comprising a piston disposed in said second bore adjacent the working port and being urged in one direction by the working port pressure, a poppet valve normally seated in said passageway and operatively connected to the piston and arranged to be unseated thereby in response to working port pressure, whereby a flow is established through said restricted passage to reduce the pressure acting on said other end of the member to permit the inlet pressure acting on said one end of the member to urge the same off its seat to connect the inlet and relief ports.

6. A regulator valve for a fluid pressure system comprising a body having inlet, working and relief ports, a bore intersecting said inlet port, a pair of spaced bores in communication respectively with the working port and the relief port and intersecting the said first bore, a valve seat formed at the intersection of said first bore and said bore connecting said relief port, means at times engaging said seat for preventing the passage of fluid from the inlet port to the relief port, said means comprising a spring-biased plunger constructed and arranged to be urged toward said seat by spring force and inlet pressure acting on one end and urged away from said seat by inlet pressure only acting on the other end thereof, a passage connecting the ends of the plunger, the effective area of said one end of the plunger being greater than the effective area of said other end of the plunger, control means for said first-named means comprising a pair of elements movable in response to pressure at the working port, a spring-biased poppet valve normally seated and arranged to be unseated by movement of said elements for relieving the pressure on one end of said plunger, the passage in said plunger having a smaller area than the effective flow area of said poppet valve when the same is unseated, the unseating of said poppet valve creating a differential pressure across the said first means to move the same to a position to pass fluid from the inlet port to the relief port, and an adjusting mechanism for varying the spring force on the poppet valve to change the value of the working port pressure which is active to unseat said poppet.

STANLEY I. MacDUFF.

REFERENCES CITED

The following references are of record in the file of this patent:

UNITED STATES PATENTS

| Number | Name | Date |
| --- | --- | --- |
| 1,866,377 | Stover | July 5, 1932 |
| 2,264,375 | Hill | Dec. 2, 1941 |
| 143,920 | Mayer | Oct. 21, 1873 |
| 2,241,665 | Herman | May 13, 1941 |
| 2,264,375 | Hill | Dec. 2, 1941 |
| 2,312,877 | Campbell | Mar. 2, 1943 |

Certificate of Correction

Patent No. 2,420,890.   May 20, 1947.

STANLEY I. MacDUFF

It is hereby certified that error appears in the printed specification of the above numbered patent requiring correction as follows:

Column 8, line 55, for the word "drops" read *drop*;

and that the said Letters Patent should be read with this correction therein that the same may conform to the record of the case in the Patent Office.

Signed and sealed this 7th day of December, A. D. 1948.

[SEAL]

THOMAS F. MURPHY,
*Assistant Commissioner of Patents.*